US009184498B2

(12) United States Patent
Schiller

(10) Patent No.: US 9,184,498 B2
(45) Date of Patent: Nov. 10, 2015

(54) EXTENDING BEAMFORMING CAPABILITY OF A COUPLED VOLTAGE CONTROLLED OSCILLATOR (VCO) ARRAY DURING LOCAL OSCILLATOR (LO) SIGNAL GENERATION THROUGH FINE CONTROL OF A TUNABLE FREQUENCY OF A TANK CIRCUIT OF A VCO THEREOF

(71) Applicant: Christopher T. Schiller, Redding, CA (US)

(72) Inventor: Christopher T. Schiller, Redding, CA (US)

(73) Assignee: GIGOPTIX, INC., San Jose, CA (US)

( * ) Notice: Subject to any disclaimer, the term of this patent is extended or adjusted under 35 U.S.C. 154(b) by 52 days.

(21) Appl. No.: 14/217,238

(22) Filed: Mar. 17, 2014

(65) Prior Publication Data

US 2014/0273817 A1 Sep. 18, 2014

Related U.S. Application Data

(60) Provisional application No. 61/799,551, filed on Mar. 15, 2013.

(51) Int. Cl.
*H04B 1/16* (2006.01)
*H04B 1/06* (2006.01)
(Continued)

(52) U.S. Cl.
CPC .................................... *H01Q 3/40* (2013.01)

(58) Field of Classification Search
CPC H03L 1/023; H03L 7/099; H03B 2200/0074; H03B 2200/0208; H03B 2201/025; H03B 5/1243; H03B 5/1265; H04B 1/006
USPC ................. 455/209, 255, 258, 262, 265, 273, 455/276.1, 561, 562.1; 342/368, 371, 372, 342/374
See application file for complete search history.

(56) References Cited

U.S. PATENT DOCUMENTS 2,087,767 A 7/1937 Nathan H Schermer
2,349,976 A 5/1944 Hatsutaro
(Continued)

FOREIGN PATENT DOCUMENTS

CA 2255347 A1 6/1999
CA 2340716 A1 3/2000
(Continued)

OTHER PUBLICATIONS

"An Analysis of Power Consumption in a Smartphone",NICTA, University of New South Wales, 2010 by Aaron Carroll, (pp. 14) https://www.usenix.org/legacy/event/usenix10/tech/full_papers/Carroll.pdf.

(Continued)

*Primary Examiner* — Quochien B Vuong
(74) *Attorney, Agent, or Firm* — Raj Abhyanker, P.C.

(57) ABSTRACT

A method includes implementing a coupled Voltage Controlled Oscillator (VCO) array with a number of VCOs, and arranging a number of switched capacitor elements in a geometric proportion in a tank circuit of each VCO to provide for finesse in control of a tunable frequency of the tank circuit. The method also includes utilizing a voltage control input of a varactor element of the tank circuit solely for achieving phase separation between the each VCO and another VCO of the coupled VCO array based on the provision of finesse in the control of the tunable frequency of the tank circuit, and mixing Local Oscillator (LO) signals generated through the number of VCOs of the coupled VCO array with signals from antenna elements of an antenna array to introduce differential phase shifts in signal paths coupled to the antenna elements during performing beamforming with the antenna array.

20 Claims, 7 Drawing Sheets

(51) Int. Cl.
*H04M 1/00* (2006.01)
*H01Q 3/40* (2006.01)

(56) References Cited

U.S. PATENT DOCUMENTS 2,810,906 A 10/1957 Lynch
2,904,674 A 9/1959 Crawford
3,036,211 A 5/1962 Broadhead, Jr. et al.
3,193,767 A 7/1965 Schultz
3,305,864 A 2/1967 Ghose
3,328,714 A 6/1967 Hugenholtz
3,344,355 A 9/1967 Massman
3,422,436 A 1/1969 Marston
3,422,437 A 1/1969 Marston
3,433,960 A 3/1969 Minott
3,460,145 A 8/1969 Johnson
3,500,411 A 3/1970 Kiesling
3,619,786 A 11/1971 Wilcox
3,680,112 A 7/1972 Thomas
3,754,257 A 8/1973 Coleman
3,803,618 A 4/1974 Coleman
3,838,423 A 9/1974 Di Matteo
3,996,592 A 12/1976 Kline et al.
4,001,691 A 1/1977 Gruenberg
4,017,867 A 4/1977 Claus
4,032,922 A 6/1977 Provencher
4,090,199 A 5/1978 Archer
4,112,430 A 9/1978 Ladstatter
4,148,031 A 4/1979 Fletcher et al.
4,188,578 A 2/1980 Reudink et al.
4,189,733 A 2/1980 Malm
4,214,244 A 7/1980 McKay et al.
4,233,606 A 11/1980 Lovelace et al.
4,270,222 A 5/1981 Menant
4,277,787 A 7/1981 King
4,315,262 A 2/1982 Acampora et al.
4,404,563 A 9/1983 Richardson
4,532,519 A 7/1985 Rudish et al.
4,544,927 A 10/1985 Kurth et al.
4,566,013 A 1/1986 Steinberg et al.
4,649,373 A 3/1987 Bland et al.
4,688,045 A 8/1987 Knudsen
4,698,748 A 10/1987 Juzswik et al.
4,722,083 A 1/1988 Tirro et al.
4,736,463 A 4/1988 Chavez
4,743,783 A 5/1988 Isbell et al.
4,772,893 A 9/1988 Iwasaki
4,792,991 A 12/1988 Eness
4,806,938 A 2/1989 Meadows
4,827,268 A 5/1989 Rosen
4,882,589 A 11/1989 Reisenfeld
4,901,085 A 2/1990 Spring et al.
4,956,643 A 9/1990 Hahn, III et al.
4,965,602 A 10/1990 Kahrilas et al.
5,001,776 A 3/1991 Clark
5,012,254 A 4/1991 Thompson
5,027,126 A 6/1991 Basehgi et al.
5,028,931 A 7/1991 Ward
5,034,752 A 7/1991 Pourailly et al.
5,041,836 A 8/1991 Paschen et al.
5,084,708 A 1/1992 Champeau et al.
5,093,668 A 3/1992 Sreenivas
5,107,273 A 4/1992 Roberts
5,128,687 A 7/1992 Fay
5,166,690 A 11/1992 Carlson et al.
5,173,701 A 12/1992 Dijkstra
5,179,724 A 1/1993 Lindoff
5,243,415 A 9/1993 Vance
5,274,836 A 12/1993 Lux
5,276,449 A 1/1994 Walsh
5,347,546 A 9/1994 Abadi et al.
5,349,688 A 9/1994 Nguyen
5,359,329 A 10/1994 Lewis et al.
5,369,771 A 11/1994 Gettel
5,375,146 A 12/1994 Chalmers
5,396,635 A 3/1995 Fung
5,408,668 A 4/1995 Tornai
5,434,578 A 7/1995 Stehlik
5,457,365 A 10/1995 Blagaila et al.
5,481,570 A 1/1996 Winters
5,486,726 A 1/1996 Kim et al.
5,497,162 A 3/1996 Kaiser
5,523,764 A 6/1996 Martinez et al.
5,539,415 A 7/1996 Metzen et al.
5,560,020 A 9/1996 Nakatani et al.
5,560,024 A 9/1996 Harper et al.
5,564,094 A 10/1996 Anderson et al.
5,583,511 A 12/1996 Hulderman
5,592,178 A 1/1997 Chang et al.
5,594,460 A 1/1997 Eguchi
5,617,572 A 4/1997 Pearce et al.
5,666,365 A 9/1997 Kostreski
5,697,081 A 12/1997 Lyall, Jr. et al.
5,710,929 A 1/1998 Fung
5,712,641 A 1/1998 Casabona et al.
5,748,048 A 5/1998 Moyal
5,754,138 A 5/1998 Turcotte et al.
5,787,294 A 7/1998 Evoy
5,790,070 A 8/1998 Natarajan et al.
5,799,199 A 8/1998 Ito et al.
5,822,597 A 10/1998 Kawano et al.
5,867,063 A 2/1999 Snider et al.
5,869,970 A 2/1999 Palm et al.
5,870,685 A 2/1999 Flynn
5,909,460 A 6/1999 Dent
5,952,965 A 9/1999 Kowalski
5,959,578 A 9/1999 Kreutel, Jr.
5,966,371 A 10/1999 Sherman
5,987,614 A 11/1999 Mitchell et al.
6,006,336 A 12/1999 Watts, Jr. et al.
6,009,124 A 12/1999 Smith et al.
6,026,285 A 2/2000 Lyall, Jr. et al.
6,061,385 A 5/2000 Ostman
6,079,025 A 6/2000 Fung
6,084,540 A 7/2000 Yu
6,111,816 A 8/2000 Chiang et al.
6,127,815 A 10/2000 Wilcox
6,127,971 A 10/2000 Calderbank et al.
6,144,705 A 11/2000 Papadopoulos et al.
6,166,689 A 12/2000 Dickey, Jr. et al.
6,167,286 A 12/2000 Ward et al.
6,169,522 B1 1/2001 Ma et al.
6,175,719 B1 1/2001 Sarraf et al.
6,272,317 B1 8/2001 Houston et al.
6,298,221 B1 10/2001 Nguyen
6,317,411 B1 11/2001 Whinnett et al.
6,320,896 B1 11/2001 Jovanovich et al.
6,336,030 B2 1/2002 Houston
6,397,090 B1 5/2002 Cho
6,463,295 B1 10/2002 Yun
6,473,016 B2 10/2002 Piirainen et al.
6,473,037 B2 10/2002 Vail et al.
6,480,522 B1 11/2002 Hoole et al.
6,501,415 B1 12/2002 Viana et al.
6,509,865 B2 1/2003 Takai
6,523,123 B1 2/2003 Barbee
6,529,162 B2 3/2003 Newberg et al.
6,587,077 B2 7/2003 Vail et al.
6,598,009 B2 7/2003 Yang
6,630,905 B1 10/2003 Newberg et al.
6,646,599 B1 11/2003 Apa et al.
6,653,969 B1 11/2003 Birleson
6,661,366 B2 12/2003 Yu
6,661,375 B2 12/2003 Rickett et al.
6,671,227 B2 12/2003 Gilbert et al.
6,697,953 B1 2/2004 Collins
6,707,419 B2 3/2004 Woodington et al.
6,768,456 B1 7/2004 Lalezari et al.
6,771,220 B1 8/2004 Ashe et al.
6,778,137 B2 8/2004 Krikorian et al.
6,788,250 B2 9/2004 Howell
6,816,977 B2 11/2004 Brakmo et al.
6,822,522 B1 11/2004 Brown et al.
6,833,766 B2 12/2004 Kim et al.

(56) References Cited

U.S. PATENT DOCUMENTS 6,870,503 B2 3/2005 Mohamadi
6,873,289 B2 3/2005 Kwon et al.
6,885,974 B2 4/2005 Holle
6,947,775 B2 9/2005 Okamoto et al.
6,960,962 B2 11/2005 Peterzell et al.
6,977,610 B2 12/2005 Brookner et al.
6,980,786 B1 12/2005 Groe
6,989,787 B2 1/2006 Park et al.
6,992,992 B1 1/2006 Cooper et al.
7,006,039 B2 2/2006 Miyamoto et al.
7,010,330 B1 3/2006 Tsividis
7,013,165 B2 3/2006 Yoon et al.
7,016,654 B1 3/2006 Bugeja
7,035,613 B2 4/2006 Dubash et al.
7,039,442 B1 5/2006 Joham et al.
7,062,302 B2 6/2006 Yamaoka
7,103,383 B2 9/2006 Ito
7,109,918 B1 9/2006 Meadows et al.
7,109,919 B2 9/2006 Howell
7,110,732 B2 9/2006 Mostafa et al.
7,126,542 B2 10/2006 Mohamadi
7,126,554 B2 10/2006 Mohamadi
7,154,346 B2 12/2006 Jaffe et al.
7,196,590 B1 3/2007 In et al.
7,245,269 B2 7/2007 Sievenpiper et al.
7,304,607 B2 12/2007 Miyamoto et al.
7,312,750 B2 12/2007 Mao et al.
7,327,313 B2 2/2008 Hemmi et al.
7,340,623 B2 3/2008 Kato et al.
7,373,127 B2 * 5/2008 Reed ............................ 455/259
7,379,515 B2 5/2008 Johnson et al.
7,382,202 B2 6/2008 Jaffe et al.
7,382,314 B2 6/2008 Liao et al.
7,382,743 B1 6/2008 Rao et al.
7,388,446 B2 * 6/2008 Souetinov et al. ........ 331/177 V
7,421,591 B2 9/2008 Sultenfuss et al.
7,440,766 B1 10/2008 Tuovinen et al.
7,463,191 B2 12/2008 Dybdal et al.
7,482,975 B2 1/2009 Kimata
7,501,959 B2 3/2009 Shirakawa
7,508,950 B2 3/2009 Danielsen
7,522,885 B2 4/2009 Parssinen et al.
7,529,443 B2 5/2009 Holmstrom et al.
7,558,548 B2 7/2009 Konchistky
7,570,124 B2 8/2009 Haralabidis et al.
7,574,617 B2 8/2009 Park
7,620,382 B2 11/2009 Yamamoto
7,663,546 B1 2/2010 Miyamoto et al.
7,664,533 B2 2/2010 Logothetis et al.
7,710,319 B2 5/2010 Nassiri-Toussi et al.
7,728,769 B2 6/2010 Chang et al.
7,742,000 B2 6/2010 Mohamadi
7,760,122 B1 7/2010 Zortea
7,812,775 B2 10/2010 Babakhani et al.
7,848,719 B2 12/2010 Krishnaswamy et al.
7,861,098 B2 12/2010 Theocharous et al.
7,912,517 B2 3/2011 Park
7,925,208 B2 4/2011 Sarraf et al.
7,934,107 B2 4/2011 Walrath
7,944,396 B2 5/2011 Brown et al.
7,979,049 B2 7/2011 Oredsson et al.
7,982,651 B1 7/2011 Zortea
7,982,669 B2 7/2011 Nassiri-Toussi et al.
7,991,437 B2 8/2011 Camuffo et al.
8,005,437 B2 8/2011 Rofougaran
8,031,019 B2 10/2011 Chawla et al.
8,036,164 B1 10/2011 Winters et al.
8,036,719 B2 10/2011 Ying
8,063,996 B2 11/2011 Du Val et al.
8,072,380 B2 12/2011 Crouch
8,078,110 B2 12/2011 Li et al.
8,102,313 B2 1/2012 Guenther et al.
8,112,646 B2 2/2012 Tsai
8,126,417 B2 2/2012 Saito
8,138,841 B2 3/2012 Wan et al.
8,156,353 B2 4/2012 Tsai
8,165,185 B2 4/2012 Zhang et al.
8,165,543 B2 4/2012 Rohit et al.
8,170,503 B2 5/2012 Oh et al.
8,174,328 B2 5/2012 Park et al.
8,184,052 B1 5/2012 Wu et al.
8,222,933 B2 7/2012 Nagaraj
8,248,203 B2 8/2012 Hanwright et al.
8,260,360 B2 * 9/2012 Rofougaran et al. ...... 455/562.1
8,265,646 B2 9/2012 Agarwal
8,290,020 B2 10/2012 Liu et al.
8,305,190 B2 11/2012 Moshfeghi
8,325,089 B2 12/2012 Rofougaran
8,340,015 B1 12/2012 Miller et al.
8,344,943 B2 1/2013 Brown et al.
8,373,510 B2 2/2013 Kelkar
8,396,107 B2 3/2013 Gaur
8,400,356 B2 3/2013 Paynter
8,417,191 B2 4/2013 Xia et al.
8,428,535 B1 4/2013 Cousinard et al.
8,432,805 B2 4/2013 Agarwal
8,446,317 B1 5/2013 Wu et al.
8,456,244 B2 6/2013 Obkircher et al.
8,466,776 B2 6/2013 Fink et al.
8,466,832 B2 6/2013 Afshari et al.
8,472,884 B2 6/2013 Ginsburg et al.
8,509,144 B2 8/2013 Miller et al.
8,542,629 B2 9/2013 Miller
8,558,625 B1 10/2013 Lie et al.
8,565,358 B2 10/2013 Komaili et al.
8,571,127 B2 10/2013 Jiang et al.
8,604,976 B1 12/2013 Chang et al.
8,644,780 B2 2/2014 Tohoku
8,654,262 B2 2/2014 Du Val et al.
8,660,497 B1 2/2014 Zhang et al.
8,660,500 B2 2/2014 Rofougaran et al.
8,700,923 B2 4/2014 Fung
8,761,755 B2 6/2014 Karaoguz
8,762,751 B2 6/2014 Rodriguez et al.
8,781,426 B2 7/2014 Ciccarelli et al.
8,786,376 B2 7/2014 Voinigescu et al.
8,788,103 B2 7/2014 Warren
8,792,896 B2 7/2014 Ahmad et al.
8,797,212 B1 8/2014 Wu et al.
8,805,275 B2 8/2014 O'Neill et al.
8,832,468 B2 9/2014 Pop et al.
8,843,094 B2 9/2014 Ahmed et al.
2001/0038318 A1 11/2001 Johnson et al.
2002/0084934 A1 7/2002 Vail et al.
2002/0159403 A1 10/2002 Reddy
2002/0175859 A1 11/2002 Newberg et al.
2002/0177475 A1 11/2002 Park
2002/0180639 A1 12/2002 Rickett et al.
2003/0003887 A1 1/2003 Lim et al.
2003/0034916 A1 2/2003 Kwon et al.
2004/0043745 A1 3/2004 Najarian et al.
2004/0095287 A1 5/2004 Mohamadi
2004/0166801 A1 8/2004 Sharon et al.
2004/0192376 A1 9/2004 Grybos
2004/0263408 A1 12/2004 Sievenpiper et al.
2005/0012667 A1 1/2005 Noujeim
2005/0030226 A1 2/2005 Miyamoto et al.
2005/0116864 A1 6/2005 Mohamadi
2005/0117720 A1 6/2005 Goodman et al.
2005/0197060 A1 9/2005 Hedinger et al.
2005/0206564 A1 9/2005 Mao et al.
2005/0208919 A1 9/2005 Walker et al.
2005/0215274 A1 9/2005 Matson et al.
2006/0003722 A1 1/2006 Tuttle et al.
2006/0063490 A1 3/2006 Bader et al.
2006/0262013 A1 11/2006 Shiroma et al.
2006/0281430 A1 12/2006 Yamamoto
2007/0047669 A1 3/2007 Mak et al.
2007/0098320 A1 5/2007 Holmstrom et al.
2007/0099588 A1 5/2007 Konchistky
2007/0123186 A1 5/2007 Asayama et al.
2007/0135051 A1 6/2007 Zheng et al.
2007/0142089 A1 6/2007 Roy
2007/0173286 A1 7/2007 Carter et al.

(56) References Cited

U.S. PATENT DOCUMENTS

| | | | |
|---|---|---|---|
| 2007/0298742 A1 | 12/2007 | Ketchum et al. | |
| 2008/0001812 A1 | 1/2008 | Jalali | |
| 2008/0039042 A1 | 2/2008 | Ciccarelli et al. | |
| 2008/0045153 A1 | 2/2008 | Surineni et al. | |
| 2008/0063012 A1 | 3/2008 | Nakao et al. | |
| 2008/0075058 A1 | 3/2008 | Mundarath et al. | |
| 2008/0091965 A1 | 4/2008 | Nychka et al. | |
| 2008/0129393 A1 | 6/2008 | Rangan et al. | |
| 2008/0218429 A1 | 9/2008 | Johnson et al. | |
| 2008/0233865 A1 | 9/2008 | Malarky et al. | |
| 2008/0240031 A1 | 10/2008 | Nassiri-Toussi et al. | |
| 2009/0023384 A1 | 1/2009 | Miller | |
| 2009/0143038 A1 | 6/2009 | Saito | |
| 2009/0153253 A1 | 6/2009 | Mei | |
| 2009/0160707 A1 | 6/2009 | Lakkis | |
| 2009/0286482 A1 | 11/2009 | Gorokhov et al. | |
| 2010/0100751 A1 | 4/2010 | Guo et al. | |
| 2010/0259447 A1 | 10/2010 | Crouch | |
| 2010/0302980 A1 | 12/2010 | Ji et al. | |
| 2011/0084879 A1 | 4/2011 | Brown et al. | |
| 2011/0095794 A1 | 4/2011 | Dubost et al. | |
| 2011/0140746 A1 | 6/2011 | Park et al. | |
| 2011/0188597 A1 | 8/2011 | Agee et al. | |
| 2011/0221396 A1 | 9/2011 | Glauning | |
| 2011/0235748 A1 | 9/2011 | Kenington | |
| 2011/0273210 A1 | 11/2011 | Nagaraj | |
| 2011/0285593 A1 | 11/2011 | Cavirani et al. | |
| 2012/0004005 A1 | 1/2012 | Ahmed et al. | |
| 2012/0013507 A1 | 1/2012 | Fusco | |
| 2012/0026970 A1 | 2/2012 | Winters et al. | |
| 2012/0092211 A1 | 4/2012 | Hampel et al. | |
| 2012/0190378 A1 | 7/2012 | Han et al. | |
| 2012/0200327 A1 | 8/2012 | Sreekiran et al. | |
| 2012/0235716 A1 | 9/2012 | Dubost et al. | |
| 2012/0235857 A1 | 9/2012 | Kim et al. | |
| 2012/0280730 A1 | 11/2012 | Obkircher et al. | |
| 2012/0284543 A1 | 11/2012 | Xian et al. | |
| 2012/0319734 A1 | 12/2012 | Nagaraj et al. | |
| 2013/0002472 A1 | 1/2013 | Crouch | |
| 2013/0039348 A1 | 2/2013 | Hu et al. | |
| 2013/0047017 A1 | 2/2013 | Lin et al. | |
| 2013/0095873 A1 | 4/2013 | Soriaga et al. | |
| 2013/0154695 A1 | 6/2013 | Abbasi et al. | |
| 2013/0176171 A1 | 7/2013 | Webber et al. | |
| 2013/0234889 A1 | 9/2013 | Hwang et al. | |
| 2013/0241612 A1 | 9/2013 | Obkircher et al. | |
| 2013/0322197 A1 | 12/2013 | Schiller et al. | |
| 2013/0339764 A1 | 12/2013 | Lee et al. | |
| 2014/0085011 A1 | 3/2014 | Choi et al. | |
| 2014/0097986 A1 | 4/2014 | Xue et al. | |
| 2014/0120845 A1 | 5/2014 | Laskar | |
| 2014/0120848 A1 | 5/2014 | Laskar | |
| 2014/0242918 A1* | 8/2014 | Weissman et al. | 455/67.14 |
| 2014/0266471 A1 | 9/2014 | Zhu et al. | |
| 2014/0266889 A1 | 9/2014 | Schiller | |
| 2014/0266890 A1 | 9/2014 | Schiller et al. | |
| 2014/0266891 A1 | 9/2014 | Schiller et al. | |
| 2014/0266892 A1 | 9/2014 | Schiller | |
| 2014/0266893 A1 | 9/2014 | Rasheed et al. | |
| 2014/0266894 A1 | 9/2014 | Rasheed et al. | |
| 2014/0273817 A1 | 9/2014 | Schiller | |

FOREIGN PATENT DOCUMENTS

| | | | |
|---|---|---|---|
| EP | 0305099 | A2 | 3/1989 |
| EP | 0754355 | B1 | 6/2000 |
| EP | 1047216 | A2 | 10/2000 |
| EP | 1261064 | A1 | 11/2002 |
| EP | 1267444 | A2 | 12/2002 |
| EP | 1672468 | A2 | 6/2006 |
| EP | 2003799 | A1 | 12/2008 |
| EP | 2151924 | A1 | 2/2010 |
| EP | 2456079 | A2 | 5/2012 |
| WO | 8601057 | A1 | 2/1986 |
| WO | 8706072 | A1 | 10/1987 |
| WO | 9107024 | A1 | 5/1991 |
| WO | 9414178 | A1 | 6/1994 |
| WO | 9721284 | A1 | 6/1997 |
| WO | 9832245 | A1 | 7/1998 |
| WO | 9916221 | A1 | 4/1999 |
| WO | 0051202 | A1 | 8/2000 |
| WO | 0055986 | A1 | 9/2000 |
| WO | 0074170 | A2 | 12/2000 |
| WO | 0117065 | A1 | 3/2001 |
| WO | 0198839 | A2 | 12/2001 |
| WO | 03023438 | A2 | 3/2003 |
| WO | 03038513 | A2 | 5/2003 |
| WO | 03041283 | A2 | 5/2003 |
| WO | 03079043 | A2 | 9/2003 |
| WO | 2004021541 | A1 | 3/2004 |
| WO | 2004082197 | A2 | 9/2004 |
| WO | 2006133225 | A2 | 12/2006 |
| WO | 2007130442 | A2 | 11/2007 |
| WO | 2010024539 | A2 | 3/2010 |
| WO | 2010073241 | A2 | 7/2010 |
| WO | 2011008146 | A1 | 1/2011 |
| WO | 2012033509 | A1 | 3/2012 |
| WO | 2014057329 | A2 | 4/2014 |
| WO | 2014150615 | A1 | 9/2014 |
| WO | 2014151933 | A2 | 9/2014 |

OTHER PUBLICATIONS

"Wake on Wireless: An Event Driven Energy Saving Strategy for Battery Operated Devices", Massachusetts Institute of Technology Cambridge, 2002 by Eugene Shih et al. (pp. 12) http://research.microsoft.com/en-us/um/people/bahl/Papers/Pdf/mobicom02.pdf.

"Reducing Leaking Electricity To 1 Watt", National Laboratory, Berkeley, CA, Aug. 28, 1998 by Alan Meier et al. (pp. 10) http://standby.lbl.gov/pdf/42108.html.

"Reducing Power in High-performance Microprocessors", Intel Corporation,Santa Clara CA. 1998 by Vivek Tiwari et al. (p. 1) http://dl.acm.org/citation.cfm?id=277227.

"Simulating the Power Consumption of Large-Scale Sensor Network Applications", Division of Engineering and Applied Sciences,Harvard University, by Victor Shnayder et al. (pp. 13) http://web.stanford.edu/class/cs344a/papers/sensys04ptossim.pdf.

"Distributed Transmit Beamforming:Challenges and Recent Progress", University of California at Santa Barbara, 2009 by Raghuraman Mudumbai et al. (pp. 9) http://spinlab.wpi.edu/pubs/Mudumbai__COMMAG__2009.pdf.

"Design and Simulation of a Low Cost Digital Beamforming (DBF) Receiver for Wireless Communication ",International Journal of Innovative Technology and Exploring Engineering (IJITEE), Vol. 2, Jan. 2, 2013 by V.N Okorogu (pp. 8) http://www.ijitee.org/attachments/File/v2i2/B0351012213.pdf.

"Frequency multiplication techniques for Sub-harmonic injection locking of LC oscillators and its application to phased-array architectures", Ottawa-Carleton Institute for Electrical and Computer Enginnering, 2013 by Yasser Khairat Soliman (pp. 2) https://curve.carleton.ca/system/files/theses/27532.pdf.

"Active Integrated Antennas", Transactions on microwave theory and techniques, vol. No. 50, No. 3, Mar. 2002 by Kai Chang et al. (pp. 8) http://www.cco.caltech.edu/~mmic/reshpubindex/MURI/MURI03/York2.pdf.

"Low cost and compact active integrated antenna transceiver for system applications", Dept. of Electronics Engineers, Texas A&M University, College Station, Texas, USA, Oct. 1996 by R.A. Flynt et al. (p. 1) http://ieeexplore.ieee.org/xpl/login.jsp?tp=&arnumber=538955&url=http%3A%2F%2Fieexplore.iee.org%2Fxpls%2Fabs_all.jsp%Farnumber%3D538955.

"Phased array and adaptive antenna transceivers in wireless sensor networks", Institute of Microsystem Technology—IMTEK, Albert-Ludwig-University, Freiburg, Germany, 2004 by Ruimin Huang et al. (p. 1) http://ieeexplore.ieee.org/xpl/login.jsp?tp=&arnumber=1333329&url=http%3A%2F%2Fieeexplore.ieee.org%2Fxpls%2Fabs_all.jsp%3Farnumber%3D1333329.

(56) References Cited

OTHER PUBLICATIONS

"A mixed-signal sensor interface microinstrument", Sensors and Acuators A: Physical, Science Direct, vol. 91, Issue 3, Jul. 15, 2001 by Keith L. Kraver et al. (p. 2) http://www.sciencedirect.com/science/article/pii/S0924424701005969.
"On the Feasibility of Distributed Beamforming in Wireless Networks", IEEE transcations on wireless communications, vol. 6,No. 5, May 2007 by R. Mudumbai. (pp. 10) https://research.engineering.uiowa.edu/wrl/sites/research.engineering.uiowa.edu.wrl/files/attachments/TWICOM07_0.pdf.
"Antenna Systems For Radar Applications Information Technology Essay", (pp. 15) http://www.ukessays.com/essays/information-technology/antenna-systems-for-radar-applications-information-technology-essay.php.
"Smart antennas control circuits for automotive communications", Mar. 28, 2012, by David Cordeau et al. (pp. 10) https://hal.archives-ouvertes.fr/file/index/docid/683344/filename/Cordeau_Paillot.pdf.
"Adaptive Beam Steering of RLSA Antenna With RFID Technology", Progress In Electromagnetics Research, vol. 108, Jul. 19, 2010 by M. F. Jamlos et al. (pp. 16) http://jpier.org/PIER/pier108/05.10071903.pdf.
"Retrodirective arrays for wireless communications", Microwave Magazine, IEEE Xplore, vol. 3,Issue 1, Mar. 2002 by R.Y. Miyamoto et al. (p. 1) http://ieeexplore.ieee.org/xpl/login.jsp?tp=arnumber=990692&url=http%3A%2F%2Fieeexplore.ieee.org%2Fxpls%2Fabs_all.jsp%3Farnumber%3D990692.
"An Active Integrated Retrodirective Transponder for Remote Information Retrieval-on-Demand", IEEE Transactions On Microwave Theory and Techniques, vol. 49, No. 9, Sep. 2011 by Ryan Y. Miyamoto et al. (pp. 5) http://www.mwlab.ee.ucla.edu/publications/2001c/mtt_trans/d.pdf.
"Ongoing retro directive Array Research at UCLA", The Institute of electrical Information and communication Engineers, by Kevin M.K. H. Leong et al. (pp. 6) http://www.ieice.org/~wpt/paper/SPS02-08.pdf.
"Digital communications using self-phased arrays", Jet Propulsion Lab., California Inst. of Technology, Pasadena, CA, USA, IEEE Xplore, vol. 49, Issue 4, Apr. 2001 by L.D. DiDomenico et al. (p. 1) http://ieeexplore.ieee.org/xpl/login.jsp?tp=&arnumber=915442&url=http%3A%2F%2Fieeexplore.ieee.org%2Fxpls%2Fabs_all.jsp%3Farnumber%3D915442.
"Large Active Retrodirective Arrays for Space Applications", NASA Technical Documents, Jan. 15, 1978 by R. C Chernoff (p. 1) https://archive.org/details/nasa_techdoc_19780013390.
"Beam Steering in Smart Antennas by Using Low Complex Adaptive Algorithms", International Journal of Research in Engineering and Technology, vol. 2 Issue: 10, Oct. 2013 by Amarnadh Poluri et al. (pp. 7) http://ijret.org/Volumes/V02/110/IJRET_110210085.pdf.
"Efficient Adaptive Beam Steering Using INLMS Algorithm for Smart Antenna", ECE Department, QIS College of Engineering and Technology, Ongole, India, Jul. 22, 2012 by E. Anji Naik et al. (pp. 5) http://www.irnetexplore.ac.in/IRNetExplore_Proceedings/Vijayawada/AEEE/AEEE_22ndJuly2012/AEEE_22ndJuly2012_doc/paper3.pdf.
"A Primer on Digital Beamforming", Mar. 26, 1998 by Toby Haynes (pp. 15) http://www.spectrumsignal.com/publications/beamform_primer.pdf.
"Design of Beam Steering Antenna Array for RFID Reader Using Fully Controlled RF Switches", Mobile and Satellite Communications Research Centre University of Bradford by D. Zhou et al. (pp. 7).
"Electronically steerable passive array radiator antennas for low-cost analog adaptive beamforming", ATR Adaptive Commun. Res. Labs., Kyoto, Japan, IEEE Xplore, 2000 by T. Ohira et al. (p. 1) http://ieeexplore.ieee.org/xpl/articleDetails.jsp?tp=&arnumber=858918&url=http%3A%2F%2Fieeexplore.ieee.org%2Fxpls%2Fabs_all.jsp%3Farnumber%3D858918.
"Sector-mode beamforming of a 2.4-GHz electronically steerable passive array radiator antenna for a wireless ad hoc network", ATR Adaptive Commun. Res. Labs., Kyoto, Japan, IEEE Xplore, 2002 by Jun Cheng et al. (p. 1) http://ieeexplore.ieee.org/xpl/articleDetails.jsp?arnumber=1016265.
"Design of electronically steerable passive array radiator (ESPAR) antennas", ATR Adaptive Commun. Res. Lab., Kyoto, Japan, IEEE Xplore, 2000 by K. Gyoda et al. (p. 1) http://ieeexplore.ieee.org/xpl/articleDetails.jsp?arnumber=875370.
"A low complex adaptive algorithm for antenna beam steering", Dept. of Electron. & Communication Engineering, Narasaraopeta Eng. Collage, Narasaraopeta, India, IEEE Xplore, 2011 by M.Z.U. Rahman et al. (p. 1) http://ieeexplore.ieee.org/xpl/login.jsp?tp=&arnumber=6024567&url=http%3A%2F%2Fieeexplore.ieee.org%2Fxpls%2Fabs_all.jsp%3Farnumber%3Farnumber%3D6024567.
"Receiver Front-End Architectures—Analysis and Evaluation", Mar. 1, 2010 by Pedro Cruz et al. (pp. 27) http://cdn.intechopen.com/pdfs-wm/9961.pdf.
"An injection-locking scheme for precision quadrature generation", CeLight Inc., Iselin, NJ, USA, Solid-State Circuits, IEEE Xplore, vol. 37, Issue 7, Jul. 2002 by P. Kinget et al. (p. 1) http://ieeexplore.ieee.org/xpl/login.jsp?tp=&arnumber=1015681&url=http%3A%2F%2Fieeexplore.ieee.org%2Fxpls%2Fabs_all.jsp%3Farnumber%3D1015681.
"The Fundamentals Of Signal Generation", Agilent Technologies, Electronic Design, Jan. 24, 2013 by Erik Diez (pp. 12) http://electronicdesign.com/test-amp-measurement/fundamentals-signal-generation.
"Microwave CMOS Beamforming Transmitters", Lund Institute of Technology, Nov. 2008 by Johan Wernehag (pp. 234) http://lup.lub.lu.se/luur/download?func=downloadFile&recordOld=1265511&fileOld=1265527.

* cited by examiner

EXTENDING BEAMFORMING CAPABILITY OF A COUPLED VOLTAGE CONTROLLED OSCILLATOR (VCO) ARRAY DURING LOCAL OSCILLATOR (LO) SIGNAL GENERATION THROUGH FINE CONTROL OF A TUNABLE FREQUENCY OF A TANK CIRCUIT OF A VCO THEREOF

CLAIM OF PRIORITY

This application is a conversion application of the U.S. provisional patent application No. 61/799,551 titled EXTENDING BEAM-FORMING CAPABILITY OF COUPLED VOLTAGE CONTROLLED OSCILLATOR (VCO) ARRAYS DURING LOCAL OSCILLATOR (LO) SIGNAL GENERATION THROUGH UTILIZATION OF SHORT TUNING STEPS IN TANK CIRCUITS THEREOF filed on Mar. 15, 2013.

FIELD OF TECHNOLOGY

This disclosure generally relates to beamforming and, more specifically, to a method, a circuit and/or a system of extending beamforming capability of a coupled Voltage Controlled Oscillator (VCO) array during Local Oscillator (LO) signal generation through fine control of a tunable frequency of a tank circuit of a VCO thereof.

BACKGROUND

A Voltage Coupled Oscillator (VCO) utilized in a coupled Voltage Controlled Oscillator (VCO) array may include a tank circuit. Voltage control coupled to a varactor element in the tank circuit may be employed to vary a frequency of the VCO. The values of an inductance and/or a capacitance (example circuit elements) of the tank circuit may be subject to variations based on factors such as manufacturing process variation, power supply and temperature. The varactor voltage control may be utilized to calibrate the aforementioned variations. However, this may come at the price of reduced range of frequencies over which the voltage control can be used.

SUMMARY

Disclosed are a method, a circuit and/or a system of extending beamforming capability of a coupled Voltage Controlled Oscillator (VCO) array during Local Oscillator (LO) signal generation through fine control of a tunable frequency of a tank circuit of a VCO thereof.

In one aspect, a method includes implementing a coupled VCO array with a number of VCOs, implementing a number of switched capacitor elements in a tank circuit of each VCO of the coupled VCO array, and arranging switched capacitor elements of the number of switched capacitor elements in a geometric proportion to provide for finesse in control of a tunable frequency of the tank circuit. The method also includes utilizing a voltage control input of a varactor element of the tank circuit solely for achieving phase separation between the each VCO and another VCO of the coupled VCO array based on the provision of finesse in the control of the tunable frequency of the tank circuit. Further, the method includes mixing LO signals generated through the number of VCOs of the coupled VCO array with signals from antenna elements of an antenna array to introduce differential phase shifts in signal paths coupled to the antenna elements during performing beamforming with the antenna array.

In another aspect, a beamforming system includes a coupled VCO array including a number of VCOs coupled to one another. Each VCO of the number of VCOs includes a tank circuit in which a number of switched capacitor elements is implemented. The number of switched capacitor elements is arranged in a geometric proportion to provide for finesse in control of a tunable frequency of the tank circuit. A voltage control input of a varactor element of the tank circuit is configured to be utilized solely for achieving phase separation between the each VCO and another VCO of the coupled VCO array based on the provision of finesse in the control of the tunable frequency of the tank circuit. The beamforming system also includes an antenna array including a number of antenna elements, and a number of mixers.

Each mixer of the number of mixers is configured to mix an LO signal generated through the each VCO of the coupled VCO array with a signal from an antenna element of the antenna array to introduce differential phase shifts in signal paths coupled to the antenna elements during performing beamforming with the antenna array.

In yet another aspect, a wireless communication system includes a beamforming system. The beamforming system includes a coupled VCO array including a number of VCOs coupled to one another. Each VCO of the number of VCOs includes a tank circuit in which a number of switched capacitor elements is implemented. The number of switched capacitor elements is arranged in a geometric proportion to provide for finesse in control of a tunable frequency of the tank circuit. A voltage control input of a varactor element of the tank circuit is configured to be utilized solely for achieving phase separation between the each VCO and another VCO of the coupled VCO array based on the provision of finesse in the control of the tunable frequency of the tank circuit. The beamforming system also includes an antenna array including a number of antenna elements, and a number of mixers.

Each mixer of the number of mixers is configured to mix an LO signal generated through the each VCO of the coupled VCO array with a signal from an antenna element of the antenna array to introduce differential phase shifts in signal paths coupled to the antenna elements during performing beamforming with the antenna array. The wireless communication system also includes a receiver channel configured to receive a combined output of the number of mixers of the beamforming system.

Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the disclosure that follows.

DETAILED DESCRIPTION

Example embodiments, as described below, may be used to provide a method, a circuit and/or a system of extending beamforming capability of a coupled Voltage Controlled Oscillator (VCO) array during Local Oscillator (LO) signal generation through fine control of a tunable frequency of a tank circuit of a VCO thereof. Although the present embodiments have been described with reference to specific example embodiments, it will be evident that various modifications and changes may be made to these embodiments without departing from the broader spirit and scope of the various embodiments.

Figure 1:
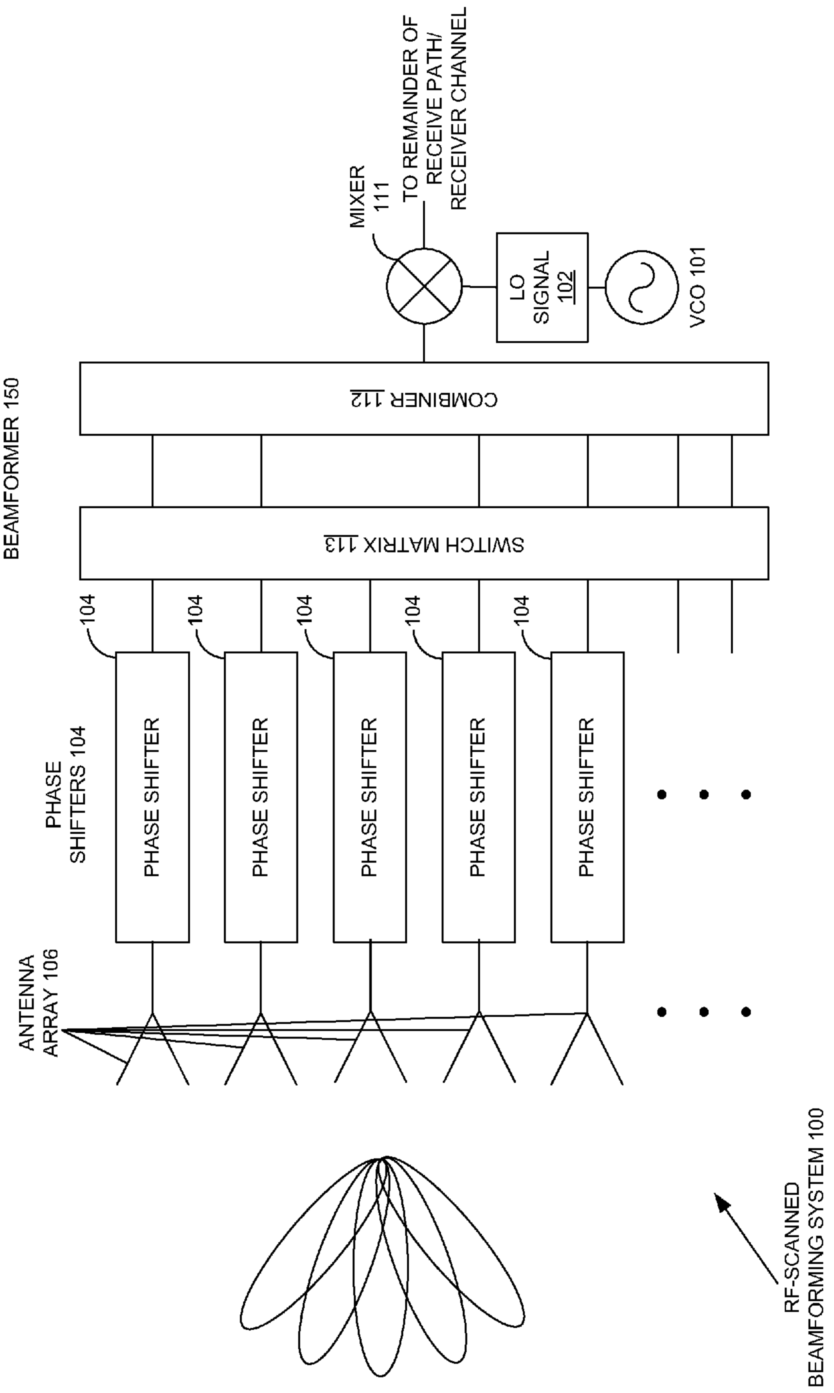
FIG. 1 is a schematic view of a Radio Frequency (RF)-scanned beamforming system.

FIG. 1 shows a Radio Frequency (RF)-scanned beamforming system 100, according to one or more embodiments. Beamforming may be a processing technique for electronically pointing fixed arrays of antenna apertures during wireless transmission and/or reception. For example, beamforming may be used to create a focused antenna beam by shifting a signal in time or in phase to provide gain of the signal in a desired direction and to attenuate the signal in other directions. Here, the arrays may be one-dimensional, two-dimensional, or three-dimensional, and the electronic pointing of an antenna array may be performed for transmission and/or reception of signals. Beamforming may be utilized to direct the energy of a signal transmitted from an antenna array and/or to concentrate the energy of a received signal into an antenna array. Electronically pointing an antenna array may be faster and more flexible than physically pointing a directional antenna.

By directing the energy from and/or concentrating the energy incoming to an antenna array, higher efficiency may be achieved when compared to implementations utilizing a standard antenna. This may result in a capability to transmit and/or receive signals correspondingly to and/or from more distant receiving and/or transmitting radios.

Figure 2:
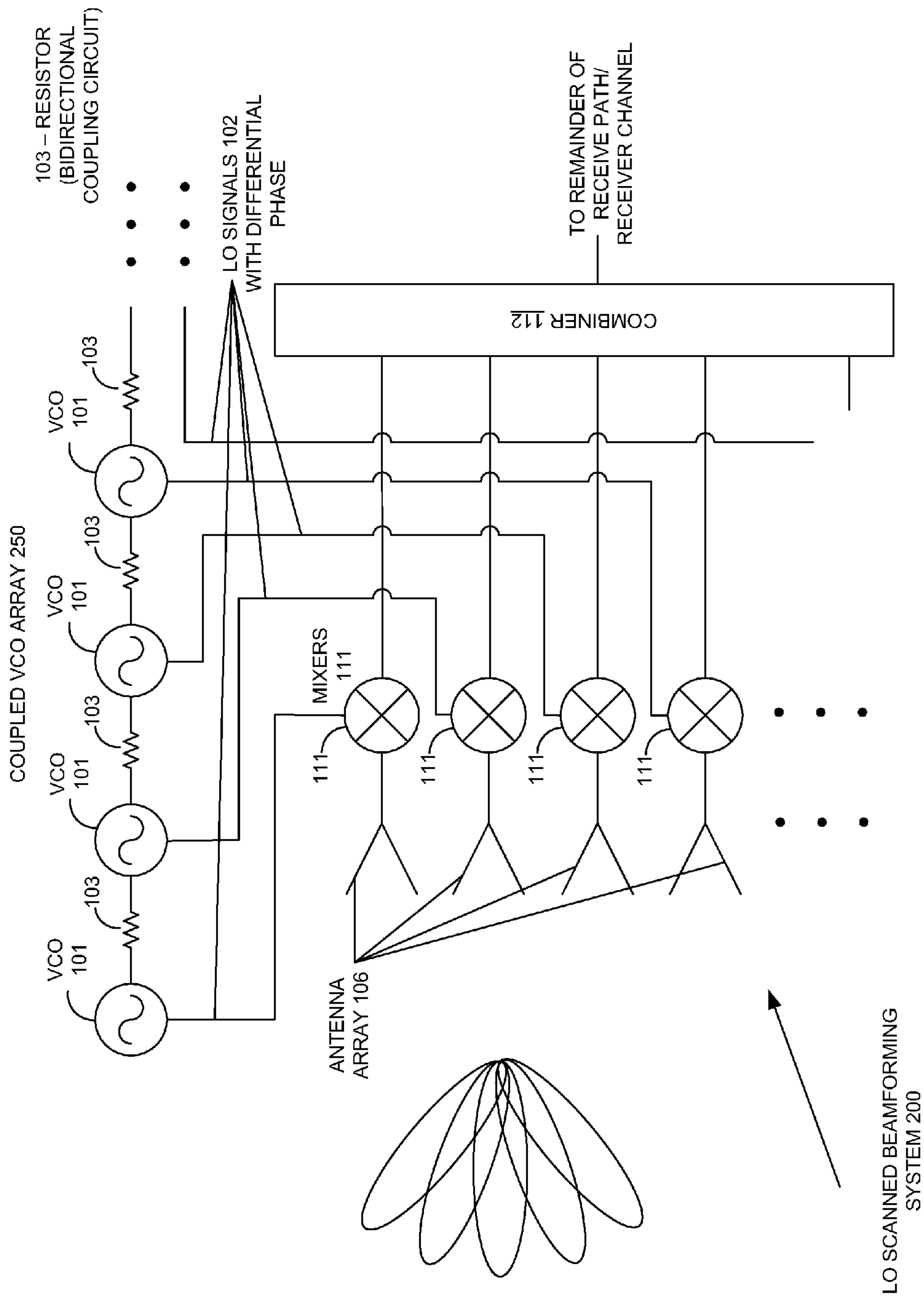
FIG. 2 is a schematic view of a Local Oscillator (LO) scanned beamforming system.

Beamforming may be commonly accomplished by introducing differential phase shifts in the signal paths connected to each of the antenna apertures (antenna elements). One conventional technique, shown in FIG. 1 (e.g., an example beamforming system such as RF-scanned beamforming system 100), may introduce the required phase shifts in the signal paths by using an RF-scanned array (e.g., including antenna array 106), in which explicit phase shifters 104 are connected directly in series with the signal paths (e.g., signal paths from antenna array 106). As shown in FIG. 2 (another example beamforming system), another conventional technique may introduce the required phase shifts in the signal paths by using a Local Oscillator (LO)-scanned array, in which LO signals 102 with differential phases are generated and the differential phase LO signals 102 input to mixers 111 (see also FIG. 1) located in the signal paths (e.g., signal paths coupled to antenna array 106).

Antenna array 106 may be utilized in beam-steering or directing and/or focusing of transmitted/received signals. By directing the energy from and/or concentrating the energy incoming thereto, a higher efficiency may be achieved compared to a standard antenna implementation. This may result in the capability to transmit and/or receive signals corresponding to and/or from more distant receiving or transmitting radios, as discussed above.

A voltage controlled oscillator (VCO) 101 (see FIGS. 1-6) may be an electronic oscillator configured to vary oscillation frequency thereof based on a voltage input. FIGS. 1-6 serve to describe the receiver (e.g., wireless receiver) context in which exemplary embodiments discussed herein may be practiced. The function of VCO 101 in LO signal generation (e.g., LO signal(s) 102 of FIGS. 1-2) as applied to receivers is well known to one of ordinary skill in the art. In order to generate differential phase LO signals, a coupled VCO array may be utilized. FIG. 2 shows an LO scanned beamforming system 200 including a coupled VCO array 250. Here, coupled VCO array 250 may include two or more VCOs 101 mutually injection locked to each other. Injection locking may be the state in which the two or more VCOs 101 exchange oscillatory energy sufficient enough to lock to a same frequency. Injection locking may be accomplished based on coupling VCOs 101 together through a bidirectional coupling circuit (e.g., resistor 103; other bidirectional coupling circuits 103 may also be used instead).

When a single VCO 101 is used, voltage control is utilized to vary the frequency thereof, as discussed above. In coupled VCO array 250, once the two or more VCOs 101 are injection locked to each other, the voltage control inputs (e.g., control inputs 306 shown in FIG. 3) to the two or more VCOs 101 may still be utilized to vary the frequency of coupled VCO array 250 provided that the voltage control inputs have the same voltage levels and are varied in the same manner. If the voltage levels are different, the phase of the signals generated by the individual VCOs 101 may be separated. The aforementioned phase separation between the LO signals generated by the individual VCOs in coupled VCO array 250 may be utilized to perform beamforming when the phase-separated LO signals (e.g., LO signals 102) are mixed (e.g., through mixers 111) with transmit or receive signals to or from antenna array 106. The outputs of mixers 111 may be combined at a combiner 112 (e.g., a combiner circuit).

FIG. 1 also shows beamformer 150; said beamformer 150 is shown as including a switch matrix 113 and combiner 112; switch matrix 113 may be understood to be circuitry associated with routing signals (e.g., RF signals) between multiple inputs and outputs; combiner 112, obviously, may combine the multiple outputs of switch matrix 113. Here, the outputs of phase shifters 104 may serve as the multiple inputs to switch matrix 113.

Figure 3:
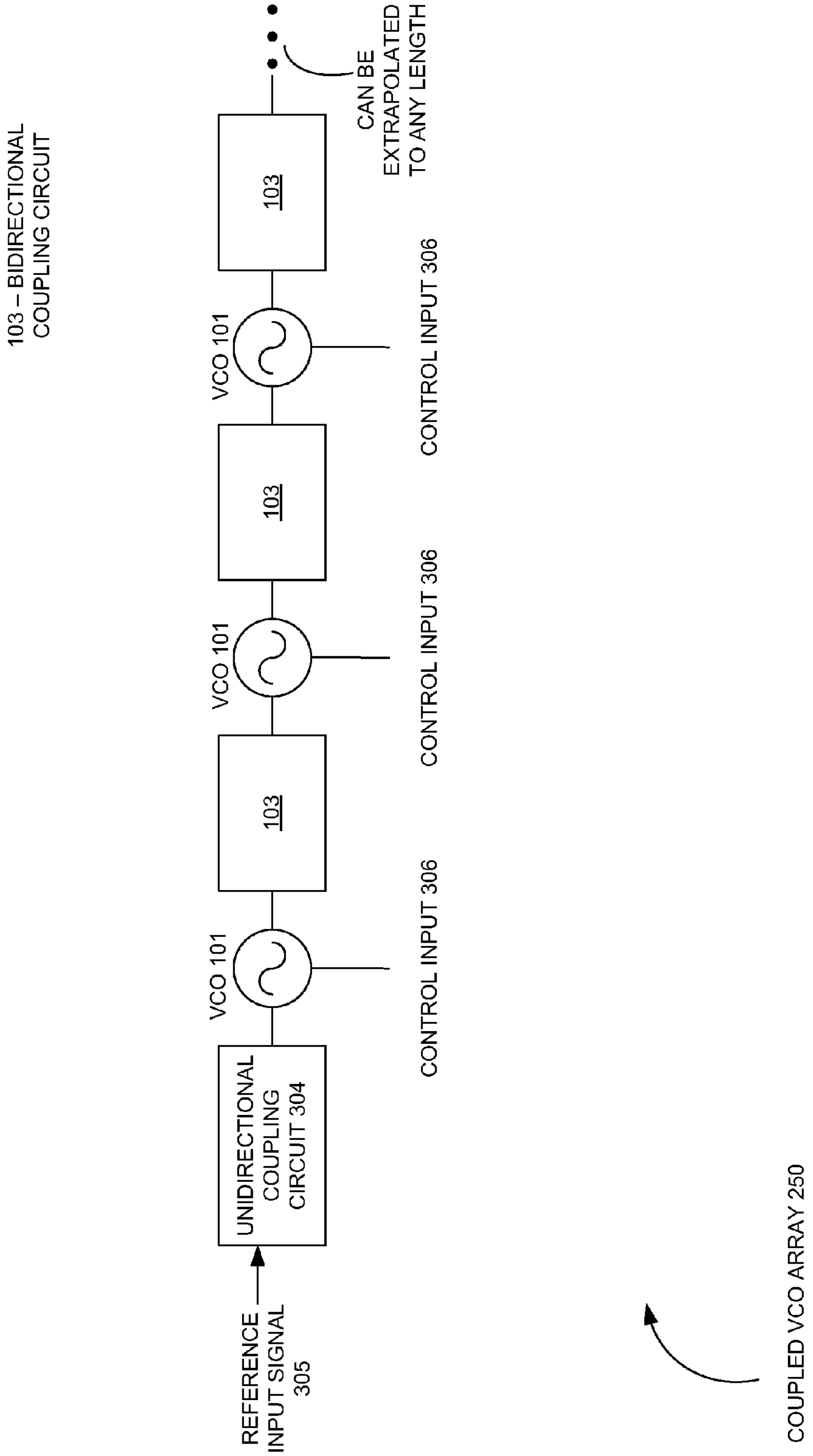
FIG. 3 is a schematic view of a coupled Voltage Controlled Oscillator (VCO) array of the LO scanned beamforming system of FIG. 2.

In FIG. 2, voltage control inputs of coupled VCO array 250 may be utilized exclusively for achieving phase separation between VCOs 101. Therefore, the voltage control inputs may be no longer available to be used for controlling the operating frequency of coupled VCO array 250. As the aforementioned operating frequency control is essential to a beamforming system, a separate reference signal may be injected into coupled VCO array 250. FIG. 3 shows coupled VCO array 250 with a reference input signal 305 thereto (e.g., shown as being coupled to VCOs 101 through unidirectional coupling circuit 304). The frequency control of reference input signal 305 may be accomplished through a system independent of coupled VCO array 250. The mechanism for injecting reference input signal 305 may also be based on injection locking. Thus, VCOs 101 of FIG. 3 may not only be mutually injection locked to each other, but also injection locked to reference input signal 305. As discussed above, control inputs 306 may be utilized to vary the frequency of coupled VCO array 250.

Coupled VCO array 250 may only generate differential phase shifts up to a certain level. Beyond this level, mutual injection locking may break down, and phase differences between VCOs 101 may be indeterminable. Thus, the range of possible LO phase differences generated through coupled VCO array 250 may be limited.

Figure 4:
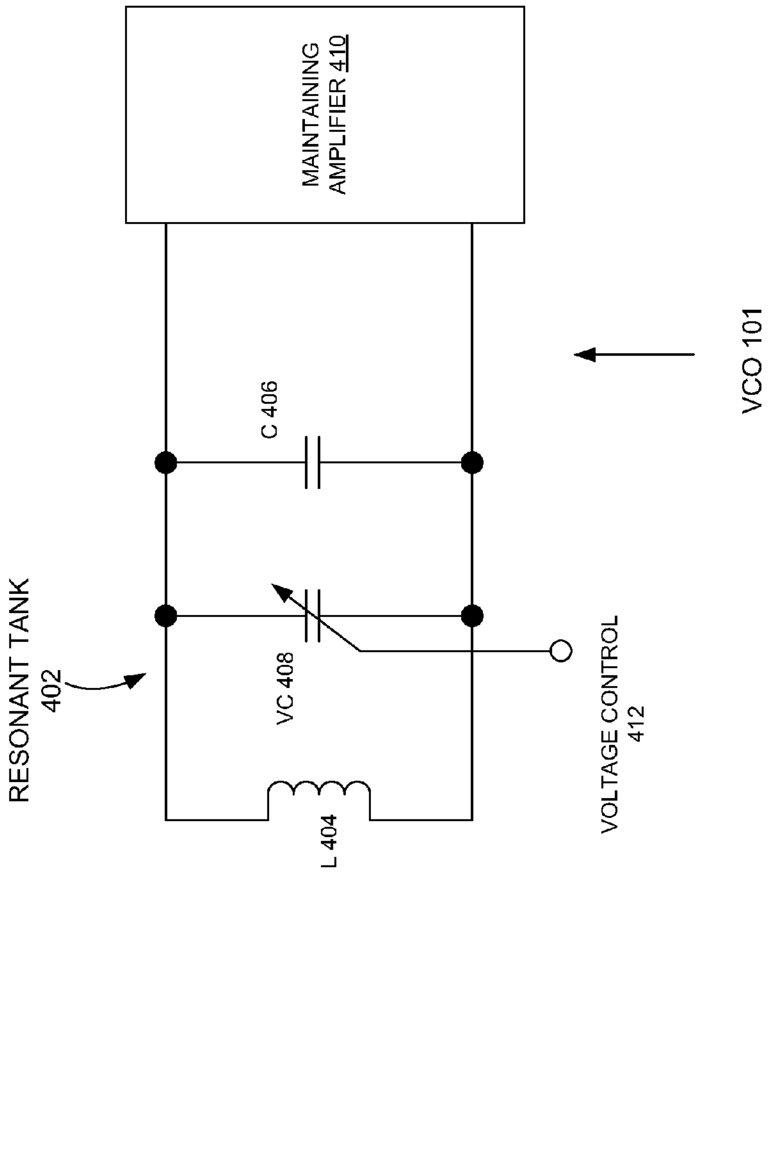
FIG. 4 is a schematic view of a circuit representation of a VCO.

It will be appreciated that concepts disclosed herein may also be applied to two-dimensional or three-dimensional arrays of VCOs 101, in addition to one-dimensional arrays thereof. Circuits associated with VCOs (e.g., VCOs 101) utilized in modern radio systems may typically be implemented using two sub-circuits, viz. a resonant tank and a maintaining amplifier. FIG. 4 shows a circuit representation of VCO 101. Here, resonant tank 402 may be a passive circuit including an inductor (L 404), a capacitor (C 406) and a voltage-variable capacitor called a varactor (VC 408). Maintaining amplifier 410 coupled to resonant tank 402 may be an active amplifying circuit with a gain (G)>1. Voltage control 412 coupled to VC 408 may be utilized to vary the frequency of VCO 101. The oscillating frequency of VCO 101 may be determined by the combination of L 404 and the sum of the capacitance of C 406 and VC 408. Voltage control 412 may vary the capacitance of VC 408 and, therefore, the frequency of VCO 101.

In real-world applications, the values of L 404 and C 406 may vary depending on factors such as manufacturing process variation, power supply voltage and temperature. Therefore, the nominal frequency of VCO 101 may also vary depending on the same factors. Voltage control 412 of VC 408 may be utilized to calibrate out the aforementioned variations; however, this may reduce the range of frequencies over which voltage control 412 is utilized to vary the desired operating frequency of VCO 101. Variations in tank capacitance (e.g., C 406) may be much greater when VCO 101 is implemented on an integrated circuit. Here, more of the tuning range of VCO 101 may be used to compensate for manufacturing induced variations in the tank capacitance.

Figure 5:
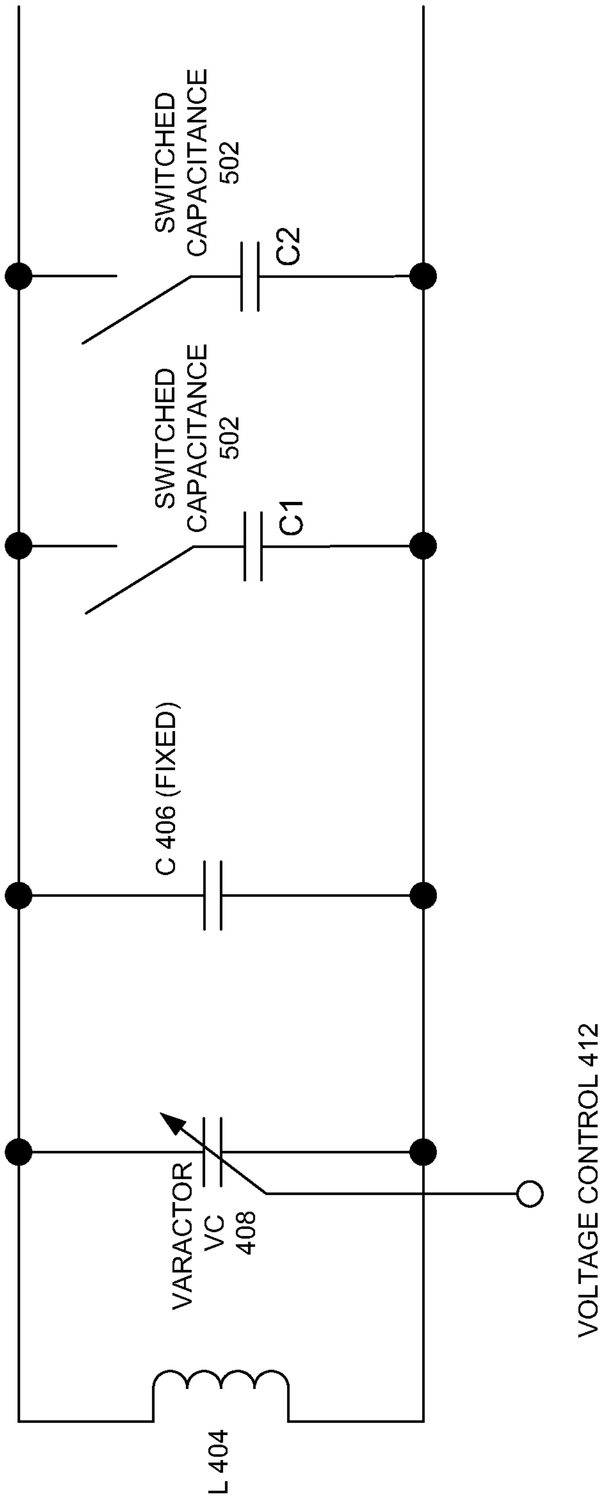
FIG. 5 is a schematic view of switched capacitances being utilized to tune a frequency of a VCO in a manner of a varactor.

A common technique to compensate for integrated circuit capacitance variations may employ additional capacitors that are added or subtracted from resonant tank 402. FIG. 5 shows switched capacitances 502 being utilized to tune the frequency of VCO 101 in the same way that VC 408 is used; here, the resulting frequency steps may be discrete instead of being continuous. The aforementioned switched frequency tuning steps utilizing switched capacitances 502 (two capacitors C1 and C2 for illustrative purposes) may be relatively large, or, in other words, coarse. Switched capacitances 502 are known to one skilled in the art; the aforementioned switched capacitances 502 may move charges in and out of capacitors C1 and C2 when corresponding switches thereof are opened and closed.

In a coupled VCO array analogous to coupled VCO array 250, the tuning voltage (e.g., through voltage control 412) for VC 408 may be utilized for both frequency variation and phase variation between VCOs 101. However, it may be highly desirable to use varactor (VC 408) control solely to achieve phase separation between adjacent VCOs 101. This may leave no way to compensate for manufacturing process variations in the tank capacitance, or to tune VCO 101 to more than one operating frequency. The injected reference input signal 305 (or, frequency) may determine the operating frequency of the coupled VCO array. However, in order for the injected reference input signal 305 to successfully injection lock the coupled VCO array, the native frequency (or, uncalibrated oscillation frequency without modifications thereto) of the coupled VCO array may need to be relatively close to the frequency of the injected reference input signal 305. If the aforementioned native frequency is far off from the frequency of the injected reference input signal 305 beyond a certain limit, the coupled VCO array may not injection lock, thereby being rendered unusable.

In one or more embodiments, therefore, the coupled VCO array may be required possess a capability to calibrate out the variations in the native frequency due to manufacturing process and/or temperature influences analogous to a single VCO. In one or more embodiments, utilizing switched tank capacitors may provide a way to free up the varactor voltage control 412 for use as only a phase separation control. The large, coarse tuning steps typically used in a single VCO may help increase the range of phase separation, but may still result in a relatively small phase separation control range. In one or more embodiments, a number of small switched capacitor steps may be employed so that the varactor voltage control 412 may be used to a larger extent for phase separation control.

Figure 6:
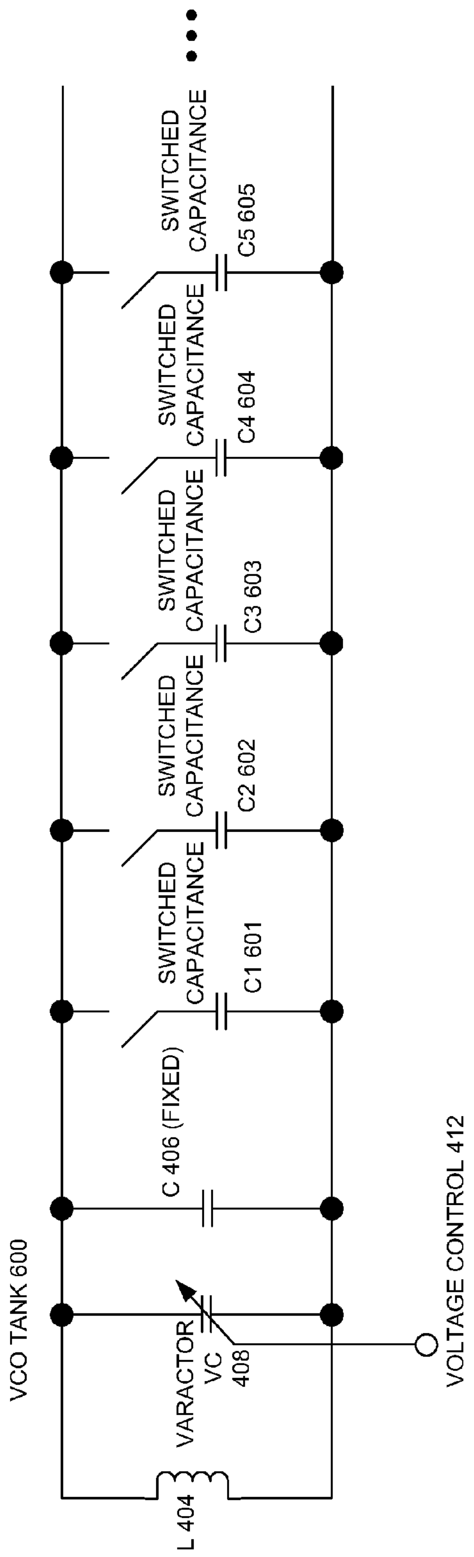
FIG. 6 shows a VCO tank with a number of switched capacitors, the VCO tank being part of a coupled VCO array, according to one or more embodiments.

FIG. 6 shows a VCO tank 600 with a number of switched capacitors (C1 601 to C5 605). Here, C1-C5 601-605 may be arranged in a geometric proportion for finesse in control. In one or more embodiments, the arrangement may provide for very small discrete steps in frequency, which, in turn, allows for high freedom in utilizing varactor voltage control 412 for phase separation.

It should be noted that exemplary embodiments discussed herein are related to utilizing switched capacitors in coupled VCO arrays (e.g., to improve phase steering performance). Also, it should be noted that FIG. 6 shows five switched capacitors merely for illustrative purposes. Also, exemplary embodiments discussed herein may benefit by additional improvements in coupled VCO array architecture and/or elements utilized therein.

Further, it should be noted that a length of a coupled VCO array (e.g., a number of VCOs 101 therein) incorporating VCO tank 600 in a VCO 101 thereof may be extrapolated as shown in FIG. 3 based on a requirement of the beamforming discussed above. Still further, it should be noted that a combined output of mixers 111 in FIG. 2 may be input to a channel of a wireless receiver incorporating the beamforming discussed above.

Figure 7:
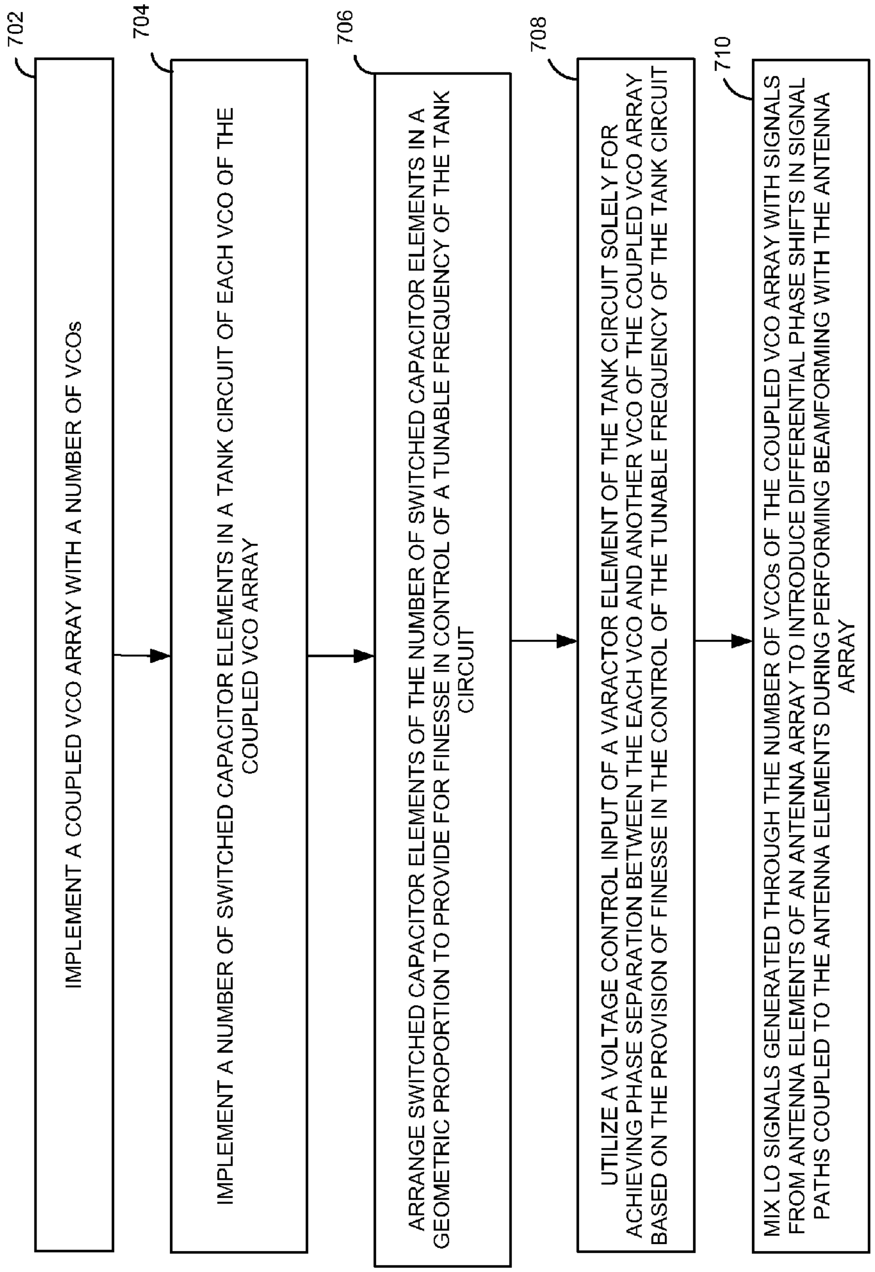
FIG. 7 is a process flow diagram detailing operations involved in extending beamforming capability of a coupled VCO array during LO signal generation through fine control of a tunable frequency of a tank circuit (e.g., the VCO tank of FIG. 6) of a VCO thereof, according to one or more embodiments.

FIG. 7 shows a process flow diagram detailing operations involved in extending beamforming capability of a coupled VCO array during LO signal generation through fine control of a tunable frequency of a tank circuit (e.g., VCO tank 600) of a VCO 101 thereof, according to one or more embodiments. In one or more embodiments, operation 702 may involve implementing the coupled VCO array with a number of VCOs 101. In one or more embodiments, operation 704 may involve implementing a number of switched capacitor elements in a tank circuit of each VCO 101 of the coupled VCO array. In one or more embodiments, operation 706 may involve arranging switched capacitor elements of the number of switched capacitor elements in a geometric proportion to provide for finesse in control of a tunable frequency of the tank circuit.

In one or more embodiments, operation 708 may involve utilizing a voltage control input of a varactor element of the tank circuit solely for achieving phase separation between the each VCO 101 and another VCO 101 of the coupled VCO array based on the provision of finesse in the control of the tunable frequency of the tank circuit. In one or more embodiments, operation 710 may then involve mixing LO signals generated through the number of VCOs 101 of the coupled VCO array with signals from antenna elements of antenna array 106 to introduce differential phase shifts in signal paths coupled to the antenna elements during performing beam-forming with antenna array 106.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A method comprising:
- implementing a coupled Voltage Controlled Oscillator (VCO) array with a plurality of VCOs;
- implementing a plurality of switched capacitor elements in a tank circuit of each VCO of the coupled VCO array;
- arranging switched capacitor elements of the plurality of switched capacitor elements in a geometric proportion to provide for finesse in control of a tunable frequency of the tank circuit;
- utilizing a voltage control input of a varactor element of the tank circuit solely for achieving phase separation between the each VCO and another VCO of the coupled VCO array based on the provision of finesse in the control of the tunable frequency of the tank circuit; and
- mixing Local Oscillator (LO) signals generated through the plurality of VCOs of the coupled VCO array with signals from antenna elements of an antenna array to introduce differential phase shifts in signal paths coupled to the antenna elements during performing beamforming with the antenna array.

2. The method of claim 1, comprising calibrating out, based on the provision of the plurality of switched capacitor elements in the tank circuit of the each VCO of the coupled VCO array, a variation in an uncalibrated oscillation frequency of the coupled VCO array due to at least one of: a manufacturing process, a power supply voltage and a temperature influence on a value of at least one circuit element of the tank circuit.

3. The method of claim 1, further comprising injection locking two or more VCOs of the coupled VCO array to each other.

4. The method of claim 1, further comprising coupling a VCO of the coupled VCO array to another VCO thereof through a bidirectional coupling circuit.

5. The method of claim 1, comprising providing one of: a one-dimensional, a two-dimensional and a three-dimensional VCO array as the coupled VCO array.

6. The method of claim 1, further comprising combining outputs of the mixing at a combiner circuit as part of the beamforming.

7. The method of claim 1, further comprising extrapolating a length of the coupled VCO array based on a requirement of the beamforming.

8. A beamforming system comprising:
- a coupled VCO array comprising a plurality of VCOs coupled to one another, each VCO of the plurality of VCOs comprising a tank circuit in which a plurality of switched capacitor elements is implemented, the plurality of switched capacitor elements being arranged in a geometric proportion to provide for finesse in control of a tunable frequency of the tank circuit, and a voltage control input of a varactor element of the tank circuit being configured to be utilized solely for achieving phase separation between the each VCO and another VCO of the coupled VCO array based on the provision of finesse in the control of the tunable frequency of the tank circuit;
- an antenna array comprising a plurality of antenna elements; and
- a plurality of mixers, each of which is configured to mix an LO signal generated through the each VCO of the coupled VCO array with a signal from an antenna element of the antenna array to introduce differential phase shifts in signal paths coupled to the antenna elements during performing beamforming with the antenna array.

9. The beamforming system of claim 8, wherein, based on the provision of the plurality of switched capacitor elements in the tank circuit of the each VCO of the coupled VCO array, a variation in an uncalibrated oscillation frequency of the coupled VCO array due to at least one of: a manufacturing process, a power supply voltage and a temperature influence on a value of at least one circuit element of the tank circuit is configured to be calibrated out.

10. The beamforming system of claim 8, wherein two or more VCOs of the coupled VCO array are configured to be injection locked to each other.

11. The beamforming system of claim 8, further comprising a plurality of bidirectional coupling circuits, each of which is configured to couple a VCO of the coupled VCO array to another VCO thereof.

12. The beamforming system of claim 8, wherein the coupled VCO array is one of: a one-dimensional, a two-dimensional and a three-dimensional VCO array.

13. The beamforming system of claim 8, further comprising a combiner circuit to combine outputs of the plurality of mixers as part of the beamforming.

14. The beamforming system of claim 8, wherein a length of the coupled VCO array is configured to be extrapolated based on a requirement of the beamforming.

15. A wireless communication system comprising:
- a beamforming system comprising:
  - a coupled VCO array comprising a plurality of VCOs coupled to one another, each VCO of the plurality of VCOs comprising a tank circuit in which a plurality of switched capacitor elements is implemented, the plurality of switched capacitor elements being arranged in a geometric proportion to provide for finesse in control of a tunable frequency of the tank circuit, and a voltage control input of a varactor element of the tank circuit being configured to be utilized solely for achieving phase separation between the each VCO and another VCO of the coupled VCO array based on the provision of finesse in the control of the tunable frequency of the tank circuit;
  - an antenna array comprising a plurality of antenna elements; and
  - a plurality of mixers, each of which is configured to mix an LO signal generated through the each VCO of the coupled VCO array with a signal from an antenna element of the antenna array to introduce differential phase shifts in signal paths coupled to the antenna elements during performing beamforming with the antenna array; and
- a receiver channel configured to receive a combined output of the plurality of mixers of the beamforming system.

16. The wireless communication system of claim 15, wherein, based on the provision of the plurality of switched capacitor elements in the tank circuit of the each VCO of the coupled VCO array of the beamforming system, a variation in an uncalibrated oscillation frequency of the coupled VCO array due to at least one of: a manufacturing process, a power supply voltage and a temperature influence on a value of at least one circuit element of the tank circuit is configured to be calibrated out.

17. The wireless communication system of claim 15, wherein two or more VCOs of the coupled VCO array of the beamforming system are configured to be injection locked to each other.

18. The wireless communication system of claim 15, wherein the beamforming system further comprises a plurality of bidirectional coupling circuits, each of which is configured to couple a VCO of the coupled VCO array to another VCO thereof.

19. The wireless communication system of claim 15, wherein the coupled VCO array of the beamforming system is one of: a one-dimensional, a two-dimensional and a three-dimensional VCO array.

20. The wireless communication system of claim 15, wherein a length of the coupled VCO array of the beamforming system is configured to be extrapolated based on a requirement of the beamforming.

* * * * *